United States Patent
Sanada et al.

[19]

[11] Patent Number: 5,986,545
[45] Date of Patent: Nov. 16, 1999

[54] VEHICLE DRIVEABILITY EVALUATION SYSTEM

[75] Inventors: Masakatsu Sanada, Numazu; Toshio Tanahashi, Susono, both of Japan

[73] Assignee: Toyota Jidosha Kabushiki Kaisha, Aichi-Ken, Japan

[21] Appl. No.: 08/938,428

[22] Filed: Sep. 26, 1997

[30] Foreign Application Priority Data

Sep. 27, 1996 [JP] Japan .................................. 8-256350

[51] Int. Cl.$^6$ .............................. B60Q 1/00; G01L 3/26
[52] U.S. Cl. ....................... 340/439; 340/679; 340/683; 340/407.1; 701/29; 701/99; 701/101; 701/111; 364/578; 73/116; 73/117.1; 73/865.6
[58] Field of Search .................................... 340/439, 679, 340/683, 407.1; 434/29, 62, 64–67, 71; 364/578; 73/865.6, 116, 117.1, 117.2, 117.3, DIG. 1; 701/29, 99, 101, 114, 111

[56] References Cited

U.S. PATENT DOCUMENTS

| | | | |
|---|---|---|---|
| 4,302,815 | 11/1981 | Tedeschi et al. | 73/116 |
| 4,466,294 | 8/1984 | Bennington et al. | 73/116 |
| 4,898,026 | 2/1990 | Damitz | 73/865.6 |
| 5,366,376 | 11/1994 | Copperman et al. | 434/69 |
| 5,435,192 | 7/1995 | Eagan et al. | 73/117.3 |

FOREIGN PATENT DOCUMENTS

| | | |
|---|---|---|
| 35 15 010 | 10/1986 | Germany . |
| 36 42 717 | 6/1988 | Germany . |
| 54-13102 | 1/1979 | Japan . |
| 61-125740 | 8/1986 | Japan . |
| 5-87698 | 4/1993 | Japan . |

Primary Examiner—Donnie L. Crosland
Attorney, Agent, or Firm—Kenyon & Kenyon

[57] ABSTRACT

In a vehicle driveability evaluation system, an engine is coupled to a dynamic dynamometer which is capable of changing a load torque and a speed in a very short time. A control unit controls the dynamic dynamometer so that the load torque and the speed of the dynamometer simulate the load and the speed of the engine when it is mounted on an actual vehicle. The driveability evaluation test is performed by operating the engine while simulating various running conditions of the vehicle by the dynamic dynamometer. Engine operating parameters such as an engine speed and an output torque are converted by a driveability data generating unit into driveability data such as an acceleration and vibration of the vehicle in accordance with the characteristic of the vehicle. These driveability data are converted by a sense-data generating unit into stimuli such as visual images, sounds and forces which can be directly perceived by the human senses. Therefore, an inspector can directly perceive the driveability of the actual vehicle from the stimuli generated by the sense-data generating unit without actually mounting the engine in the vehicle body.

4 Claims, 3 Drawing Sheets

VEHICLE DRIVEABILITY EVALUATION SYSTEM

BACKGROUND OF THE INVENTION

1. Field of the Invention

The present invention relates to a vehicle driveability evaluation system which is capable of evaluating an influence of a characteristic of a performance of an engine on the driveability of a vehicle on which the engine is to be installed, by operating the engine on a test bed without installing it on the vehicle body.

2. Description of the Related Art

Heretofore, an influence of a characteristic of an engine performance on a driveability of a vehicle (including the comfort of the vehicle as well as vehicle performance such as an acceleration, vibration, noise) was tested by actually driving a vehicle mounted with the actual engine on a test course or a public road. However, the test of the driveability on a test course or a public road requires considerable time and cost, and there has been a long-standing need for a vehicle driveability evaluating system which is capable of evaluating a driveability of a vehicle (i.e., a combination of a specific vehicle body and a specific engine) without actually driving the vehicle.

Japanese Unexamined Utility Model Publication (Kokai) No. 61-125740 discloses one type of the vehicle driveability evaluation system of this kind. The system in the '740 publication uses a chassis dynamometer to evaluate the vehicle driveability. In the system of the '740 publication, a complete vehicle including an actual vehicle body and an actual engine is tested, i.e., the complete vehicle is placed on a rotating drum of a chassis dynamometer, and the vehicle is driven under various running resistance given by the chassis dynamometer. The system in the '740 publication detects the rotational speed of the rotating drum (i.e., a running speed of the vehicle), and extracts low frequency components from the rate of change in the rotational speed of the drum (i.e., the differential value of the running speed of the vehicle). Further, the system indicates the magnitude of the low frequency components on an analog gauge or an LED indicator.

It is known that the magnitude of the low frequency components of the rate of change in the running speed has a relationship with the magnitude of a surge, i.e., a low frequency vibration of the vehicle body in the longitudinal direction, and the surge of the vehicle largely affects the driveability of the vehicle. Therefore, the system in the '740 publication is capable of acquiring a driveability data (the low frequency component of the change in the running speed of the vehicle) which represents the driveability of the vehicle (in this case, the magnitude of the surge) without actually driving the vehicle on the test course or a public road.

Although the system in the '740 publication is advantageous in that it allows evaluation of the magnitude of the surge without actually driving the vehicle on a test course or a public road and shortens the time required for the vehicle driveability evaluation test, the system in the '740 publication has some problems.

For example, the system in the '740 publication requires a complete vehicle for testing the driveability. Therefore the complete vehicle body and the engine must be available when the test is carried out. However, in some cases, it is preferable to evaluate the influence of the engine performance characteristic on the driveability of the vehicle before the vehicle body is manufactured so that the engine can be modified to improve the driveability of the vehicle. In such a case, the system in the '740 publication cannot be used.

Further, since the test vehicle is driven on the rotating drum of the chassis dynamometer in the system of the '740 publication, it is difficult to simulate various running condition (such as running conditions on a rough road, slope or highway) of the vehicle and the driveability of the vehicle cannot be tested in the various running conditions.

Further, the magnitude of the low frequency components of the rate of change in the vehicle running speed is indicated as a numerical value, or the magnitude of the low frequency components is roughly divided into ranges in accordance with the magnitude of the influence thereof on the driveability and the ranges are indicated by the LED indicator in the '740 publication. However, since it is difficult for an inspector to comprehend the influence on the driveability from the numerical value or the indication of the LED indicator, the influence on the driveability is not evaluated correctly in some cases. Especially, since the magnitude of the influence of the factors such as acceleration and vibration on the driveability cannot be quantified, it is difficult to evaluate the magnitudes of influences of these factors on the driveability even if these factors are expressed in numerical values.

SUMMARY OF THE INVENTION

In view of the problems in the related art as set forth above, the object of the present invention is to provide a vehicle driveability evaluation system which is capable of precisely evaluating the influence of the engine performance characteristic on the driveability of the vehicle without mounting the engine in the actual vehicle body.

This object is achieved by a vehicle driveability evaluation system according to the present invention, which comprises running condition simulating means for generating a load of an engine corresponding to running conditions of a vehicle on which the engine is to be installed and for imposing the load on the engine while the engine is operated on a test bed, operating parameter detecting means for detecting engine operating parameters including a speed and an output torque of the engine when the load is imposed on the engine by the running condition simulating means, driveability data generating means for generating driveability data representing a driveability of the vehicle based on the detected operating parameters and sense-data generating means for converting the driveability data into a stimulus which can be directly perceived by the human senses.

According to the present invention, only the engine, without the vehicle body, is operated on a test bed in order to evaluate the driveability of the vehicle on which the engine is to be installed.

The running condition simulating means imposes a load on the engine. The load imposed by the running condition simulating means corresponds to the running conditions of the vehicle. Namely, when the engine is mounted on the vehicle, the load imposed on the engine changes in accordance with the running conditions of the vehicle such as a running speed of the vehicle, acceleration or deceleration of the vehicle and conditions of the road (the surface conditions of the road, gradient of the road, etc.). Further, even if the running conditions of the vehicle are the same, the load of the engine and the change in the load varies in accordance with the weight of the vehicle and the design of the drive system of the vehicle. The running condition simulating means in the present invention simulates the load imposed on the engine under various running conditions of the vehicle on which the engine is to be mounted. Therefore, the load which is identical to the load imposed on the engine when the vehicle is running on the actual road is imposed on the engine on the test bed. Further, the driveability data generating means generates the driveability data based on the operating parameters of the engine (parameters representing the engine operating conditions such as the engine speed, the engine output torque, the cooling water temperature and the intake air temperature of the engine) when the load simulated by the running condition simulating means is imposed on the engine. The driveability data generated by the driveability data generating means are the data representing the driveability of the vehicle such as changes in the engine speed and the engine output torque and the acceleration in the engine speed etc.

The sense-data generating means converts the driveability data into a stimulus which can be directly perceived by the human senses. The stimulus generated by the sense-data generating means are, for example, a sound, light, vibration and changes therein, a visual image and forces exerted on the human body.

Therefore, the inspector can comprehend the driveability from these stimuli more directly than in the case where the driveability data are expressed by numerical values.

BRIEF DESCRIPTION OF THE DRAWINGS

The present invention will be better understood from the description as set forth hereinafter, with reference to the accompanying drawings in which.

DESCRIPTION OF THE PREFERRED EMBODIMENT

Hereinafter, an embodiment of the present invention will be explained in detail with reference to the accompanying drawings.

Figure 1:
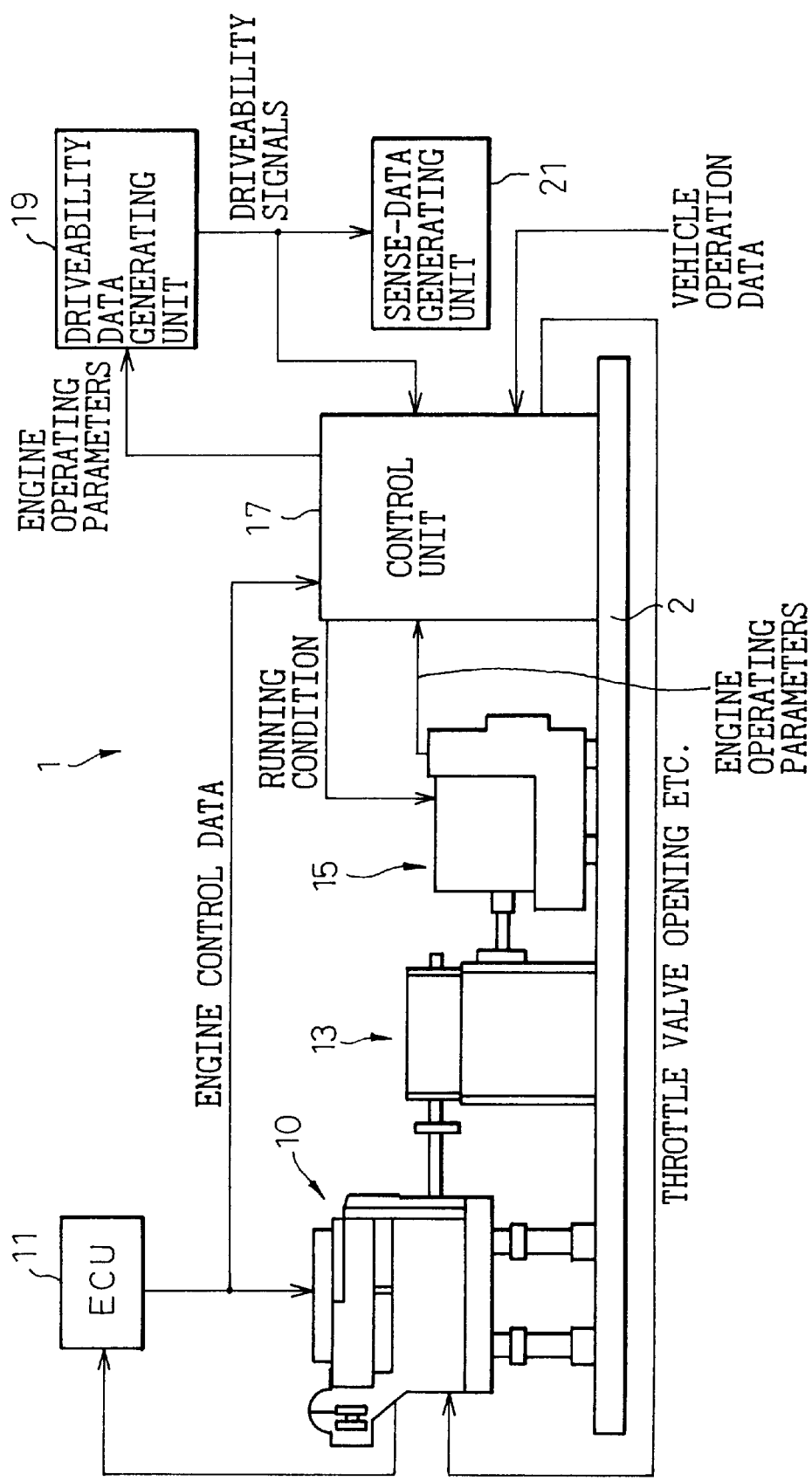
FIG. 1 schematically illustrates the general configuration of an embodiment of the vehicle driveability evaluation system according to the present invention.

FIG. 1 shows a general configuration of an embodiment of a vehicle driveability evaluation system according to the present invention.

In FIG. 1, reference numeral 1 designates a vehicle driveability evaluation system as a whole. The vehicle driveability evaluation system is provided with a test bed 2. An engine 10 is mounted on the test bed 2 and an output shaft thereof is connected to a dynamic dynamometer 15 via a reduction gear 13. The dynamic dynamometer 15 will be explained later.

Reference numeral 17 in FIG. 1 designates a control unit of the dynamic dynamometer 15 which comprises a digital computer. As explained later, the control unit 17 controls the dynamic dynamometer 15 in such a manner that the dynamometer 15 generates the load torque simulating running conditions of a vehicle on which the engine 10 is to be mounted. The control unit 17 further controls a degree of opening of a throttle valve of the engine 10 via an actuator (not shown).

Numeral 11 in FIG. 1 is an electronic control unit (ECU) of the engine 10. The ECU 11 comprises a microcomputer which controls a fuel injection amount and an ignition timing of the engine 10 based on an intake air pressure and a speed of the engine 10. Although not shown in FIG. 1, sensors used for an actual engine (such as an intake air pressure sensor, a crank angle sensor, a cooling water temperature sensor) are mounted on the engine 10 and signals from the sensors are supplied to the ECU 11 in order to perform the above-noted control.

Numeral 19 in FIG. 1 represents a driveability data generating unit which converts operating parameters such as the engine speed and the engine output torque measured on the test bed 2 under various running conditions of the vehicle into driveability signals representing the driveability of the vehicle. Further, numeral 21 in FIG. 1 designates a sense-data generating unit which converts the driveability signals from the driveability data generating unit 19 into information (stimuli) perceivable by human senses.

The driveability data generating unit 19 and the sense-data generating unit 21 are explained later.

Next, the dynamic dynamometer 15 in this embodiment will be explained. The dynamic dynamometer 15 has a construction similar to that of an electric motor and has a rotor of very small moment of inertia in order to eliminate a flywheel effect. The dynamic dynamometer 15 functions as an electric generator when it is driven by the engine. When the dynamic dynamometer 15 is driven by the engine, the load imposed on the engine and the engine speed can be controlled by adjusting the output electric current of the dynamometer 15. Therefore, the engine can be tested under various load conditions by the dynamic dynamometer 15. When the dynamic dynamometer 15 functions as an electric motor, a rotating torque is transferred from the dynamometer 15 to the engine 10, and the torque transferred to the engine output shaft can be controlled by adjusting an input electric current of the dynamic dynamometer 15. Thus, during the engine test, the engine loads under various running conditions of the vehicle such as during a descending of slope and an engine brake can be simulated on the test bed by adjusting the input electric current of the dynamic dynamometer 15. The dynamic dynamometer 15 used in this embodiment is capable of changing the load torque and the rotating speed very quickly by controlling the input/output electric current of the dynamometer 15 precisely. Therefore, the dynamic dynamometer 15 can precisely simulate the changes in the load torque and the speed of the engine even in an actual transient operating condition such as an on/off operation of a clutch and a sudden acceleration or deceleration. The dynamic dynamometer of this type is commercially available, for example, from AVL List GmbH (Austria) as "DYNAMIC ENGINE TEST BED SYSTEM".

In this embodiment, the control unit 17 simulates the operating conditions of the engine 10 in various running conditions of the vehicle on which the engine will be installed by controlling the engine load and the engine speed in accordance with the characteristic of the vehicle. For example, in an accelerating operation of the vehicle, the control unit 17 controls the degree of opening of the throttle valve in accordance with the degree of acceleration and, at the same time, controls the dynamic dynamometer 15 so that it generates the load torque in accordance with the characteristic of the vehicle in the accelerating operation. The load torque generated by the dynamic dynamometer 15 includes not only an acceleration torque determined by the factors such as the weight of the vehicle and the gear ratio of the transmission but also a running resistance torque determined by the factors such as tires used, running speed and the road conditions and fluctuations of the load torque caused by a torsional vibration of the drive system (the system composed of the engine, the transmission, drive shaft etc.) of the vehicle. The engine loads and the engine speeds in the respective running conditions of the vehicle are determined from a simulation model of the vehicle which is prepared in accordance with design specification of the vehicle and the road conditions. Namely, the dynamic dynamometer 15 together with the control unit 17 in this embodiment function as the running condition simulating means cited in the claims.

The engine operating parameters such as the output power and the speed are collected by the control unit 17. Further, the control unit 17 is connected to the ECU 11 of the engine 10 and the engine control data such as the fuel injection amount and the ignition timing of the engine 10 are sent to the control unit 17 from the ECU 11. The control unit 17 is also connected to the driveability data generating unit 19 and the driveability signals are sent to the control unit 17 from the driveability data generating unit 19. The control unit 17 stores the engine control data, the engine operating parameters and the driveability signals at the respective time points during the engine operation. Further, the control unit 17 collects vehicle operation data which represent the drivers operations such as the amounts of operation of an accelerator, steering wheel, brake and clutch and controls the degree of opening of the throttle valve of the engine 10 and the load and the speed of the dynamic dynamometer 15 based on the simulation model of the vehicle. Namely, the control unit 17 in this embodiment also functions as the operating parameters detecting means, the storage means and the control means cited in the claims.

Next, the driveability data generating unit 19 in this embodiment will be explained.

The driveability data generating unit 19 comprises a digital computer similar to that of the control unit 17 and converts the engine operating parameters such as the output torque and the speed of the engine into the driveability signals representing the driveability of the vehicle based on a simulating model similar to that used by the control unit 17. For example, the driveability data generating unit 19 calculates the running speed, the acceleration and the rate of change in the acceleration of the vehicle based on the characteristic of the vehicle (such as the characteristic of the transmission and a torsional stiffness of the drive system) and the running conditions of the vehicle. The acceleration of the vehicle and the rate of change thereof directly affects the driveability of the vehicle, and varies in accordance with the factors such as the weight of the vehicle and the gear ratio of the transmission even if the speed and the output torque of the engine are the same. Further, the surge caused by the torsional vibration of the drive system cannot be calculated from the engine speed and the output torque only. The driveability data generating unit 19 in this embodiment generates information (data) directly represents the driveability of the vehicle by converting the engine operating parameters into the acceleration of the vehicle and the rate of change thereof based on the characteristic of the vehicle. Namely, the driveability data generating unit 19 in this embodiment functions as the driveability data generating means cited in the claims.

Next, the sense-data generating unit 21 in this embodiment will be explained. The sense-data generating unit 21 in this embodiment functions as the sense-data generating means cited in the claims which converts the driveability data generated by the driveability data generating unit 19 such as the acceleration of the vehicle and the rate of change thereof into information (stimuli) directly perceivable by the human senses. The driveability data is generated by the driveability data generating unit 19 in the form of numerical value or electric voltage signal or electric current signal. However, it is difficult to directly comprehend the driveability of the vehicle from these data even though the magnitudes of these signals are indicated by meters or indicators as explained in the related art. Therefore, the driveability data generated by the driveability data generating unit 19 are converted into stimuli such as sound, light, visual images, vibrations and external forces exerted on the human body, which are directly perceived by the human senses, so that the driveability of the vehicle can be directly evaluated by the inspector.

The information (the stimuli) generated by the sense-data generating unit 21 may be any stimuli as long as they are perceived directly by the human senses without requiring interpretation by the human brain (such as in the case of the numerical values). Further, the information generated by the sense-data generating unit 21 is preferably in the form of the stimuli such as acceleration, vibration and sound on which a driver of the vehicle assesses the driveability in the actual operation of the vehicle.

Therefore, the sense-data generating unit 21 in the embodiments explained below are designed to generate the stimuli used by the driver when assessing the driveability of the vehicle in the actual operation. In the following embodiments, the sense-data generating unit 21 converts the acceleration of the vehicle (the driveability data) into stimuli perceivable by the human senses.

Figure 2:
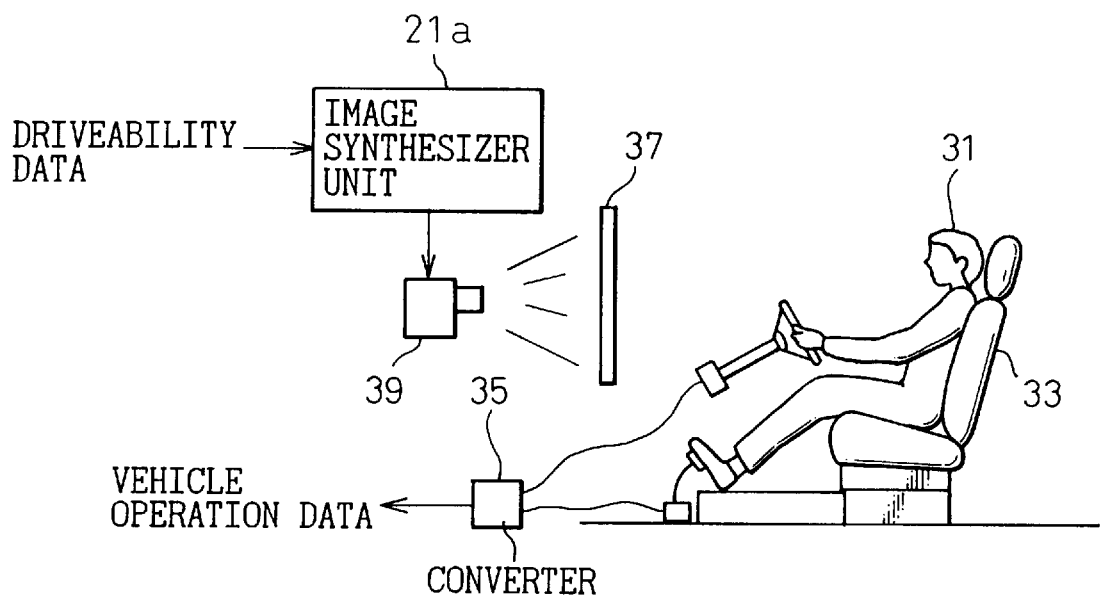
FIGS. 2 and 3 are schematic illustrations of an embodiment of the sense-data generating unit in FIG. 1.
Figure 3:
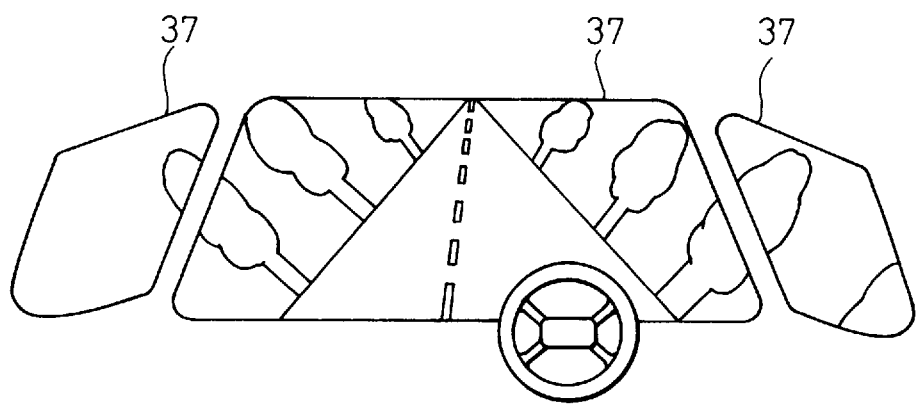

FIG. 2 schematically illustrates an embodiment of the sense-data generating unit 21 which converts the speed and the acceleration of the vehicle into visual information. In FIG. 2, reference numeral 21 represents the sense-data generating unit as a whole. In the sense-data generating unit 21 in FIG. 2, the inspector 31 takes a seat 33 which simulates driver's seat of the actual vehicle and operates dummy operating devices such as a steering wheel, a brake pedal, an accelerator pedal, a clutch pedal and a shift lever, to simulate operating the actual vehicle. The amounts of operations of these devices are converted into electric signals by a converter 35 and are sent to the control unit 17. A screen 37 is disposed in front of the seat 33, and a projector 39 is provided in order to project a visual image on the screen 37. FIG. 3 shows an example of the visual image projected on the screen 37. As can be seen from FIG. 3, the visual image projected on the screen 37 simulates the view from the windows of the actual vehicle. This image is, for example, synthesized by the computer, and moves synchronously with a running speed of the vehicle which is determined by a running speed signal generated by the driveability data generating unit 19. Numeral 21a in FIG. 2 is an image synthesizer unit which changes the moving speed of the visual image in FIG. 3 in accordance with the running speed signal from the driveability data generating unit 19. In this embodiment, since the moving speed of the visual image changes synchronously with the running speed of the vehicle, the inspector 31 can perceive the acceleration and deceleration of the vehicle directly from the change of the moving speed of the image. Therefore, the acceleration of the vehicle, i.e., the driveability data can be directly perceived by the inspector. The moving speed of the visual image on the screen 37, i.e., a virtual running speed of the vehicle is not necessarily to be identical with the running speed of the vehicle and may be increased in proportion to the actual running speed of the vehicle so that the acceleration perceived by the inspector is amplified.

Figure 4:
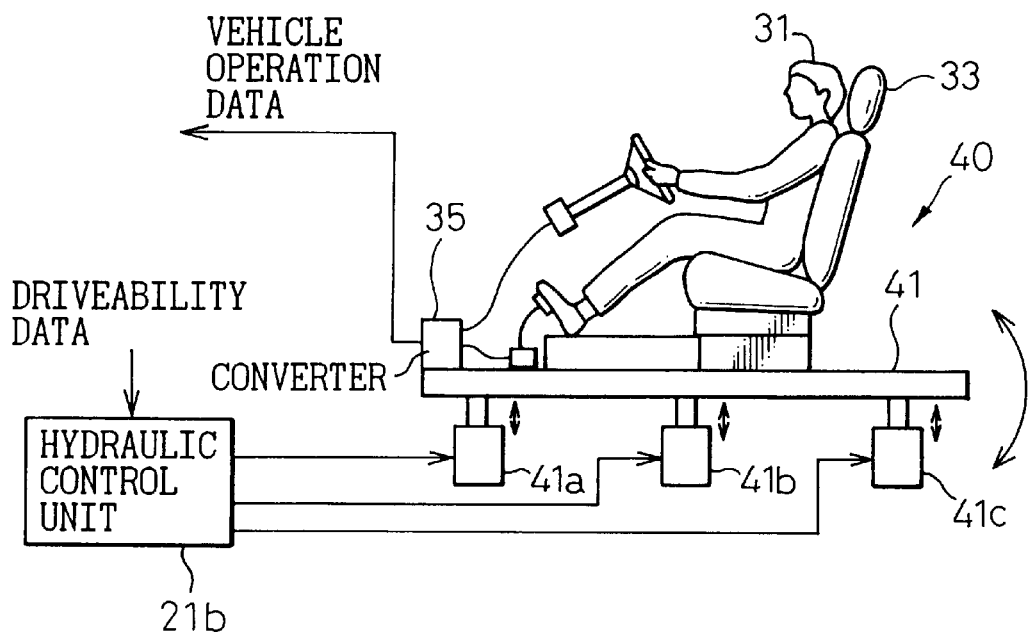
FIG. 4 is a schematic illustration of another embodiment of the sense-data generating unit in FIG. 1.

FIG. 4 shows another embodiment of the sense-data generating unit 21 which converts the acceleration signal, i.e., driveability data from the driveability data generating unit 19 into an actual acceleration (force) exerted on the human body.

In FIG. 4, the sense-data generating unit 21 is provided with the seat 33, dummy operating devices and the converter 35, all similar to those in FIG. 2. In this embodiment, the seat 33 and dummy operating devices are mounted on an acceleration synthesizing unit 40. The acceleration synthesizing unit 40 includes a platform 41 on which the seat 33 and the dummy operating devices are mounted, and a plurality of hydraulic cylinders (in FIG. 3, only three cylinders 41a, 41b and 41c are shown) disposed under the platform 41. In this embodiment, the platform 41 can be inclined in an arbitrary direction by controlling the displacements of the hydraulic cylinders 41a through 41c. For example, when the displacements of the cylinders are adjusted so that the displacements of the cylinders increase to the direction from the cylinder 41c to the cylinder 41a, the platform 41 and the seat 33 incline backward and gravity forces the inspector 31 on the seat to lean in an oblique backward direction. Therefore, the direction of the force (gravity) becomes similar to the direction of the resultant force of the acceleration of the vehicle and gravity in the actual operation of the vehicle. Conversely, when the displacement of the cylinders are adjusted so that the displacements of the cylinders increase to the direction from the cylinder 41a to the cylinder 41c, the platform 41 and the seat 33 incline forward and the direction of the force exerted on the inspector becomes similar to the direction of the force exerted during the actual deceleration of the vehicle. The magnitude and the direction of the force (the virtual acceleration of the vehicle) can be adjusted by changing the inclination of the platform 41. In this embodiment, the inclination of the platform 41 is controlled by adjusting the displacements of the hydraulic cylinders 41a through 41c in accordance with the acceleration signal generated by the driveability data generating unit 19. Therefore, the inspector 31 can directly perceive the acceleration of the actual vehicle. Further, if the displacements of the cylinders 41a through 41c are controlled so that the displacements of the cylinders fluctuate in accordance with a signal representing the vibration of the vehicle, the inspector can experience the vibration of the vehicle using the seat 33 of the actual vehicle.

Numeral 21b in FIG. 4 represents a hydraulic control unit which can supply hydraulic fluid to the respective cylinders in accordance with the acceleration signal and the vibration signal from the driveability data generating unit 19 so that the platform 41 inclines and vibrates to simulate the actual acceleration and the vibration of the vehicle.

According to the present embodiment, the inspector can experience the acceleration and the vibration of the vehicle using the seat used for the actual vehicle. Therefore, the factors affecting the driveability of the vehicle such as the acceleration, the surge and the vibration of the vehicle and their attenuation by the actual seat can be directly perceived by the inspector. Further, if the visual image as explained in FIGS. 2 and 3 is also used in this embodiment, the driveability perceived by the inspector becomes more realistic and the evaluation of the driveability becomes easier.

Figure 5:
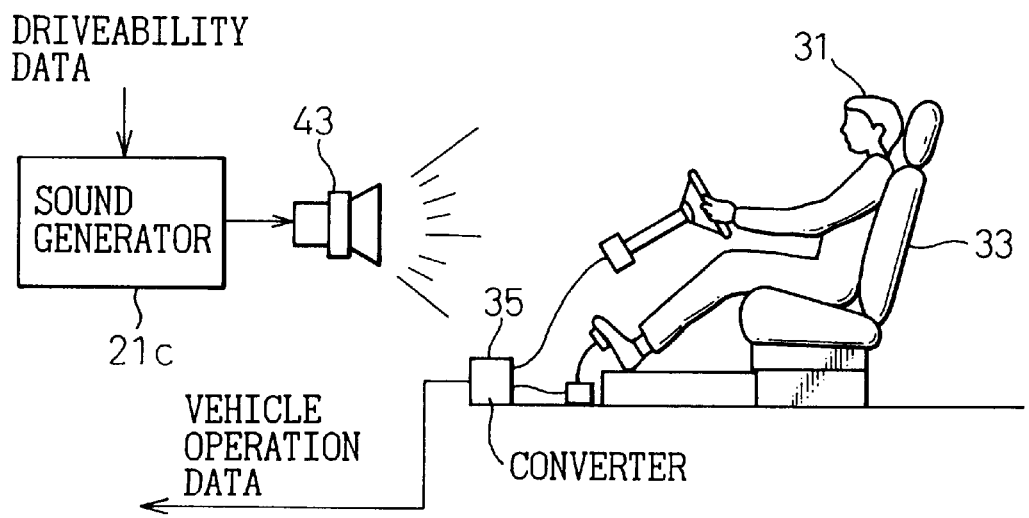
FIG. 5 is a schematic illustration of another embodiment of the sense-data generating unit which is different from those in FIGS. 2 through 4.

FIG. 5 shows another embodiment of the sense-data generating unit 21 which converts the speed signal from the driveability data generating unit 19 into an audible information.

In FIG. 5, numeral 33 represents the seat and 35 represents the converter for operating data of the vehicle as explained in FIGS. 2 through 4. The sense-data generating unit 21 in this embodiment is provided with a loudspeaker 43 and sound generator 21c which generates sounds in accordance with the speed signal from the driveability data generating unit 19. For example, the sound generator 21c generates the sounds of the engine and exhaust system of the vehicle and changes the frequency distribution of these sounds in accordance with the engine speed and the engine output torque. The sound generator 21c also generates the sound caused by the friction between the tires of the vehicle and the road surface and the sound caused by the creaking of various parts of the vehicle body, and changes the frequency distribution of these sounds in accordance with the running speed of the vehicle. According to this embodiment, the inspector 31 can perceive the running speed of the vehicle and its change (the acceleration of the vehicle, the surge etc.) directly through the audible information.

Although the embodiments in FIGS. 2 through 5 can be used separately, if two or more of them are used together, the driveability perceived by the inspector becomes more realistic and the evaluation of the driveability can be easier.

Next, another embodiment of the sense-data generating unit 21 which is different from the previous embodiments will be explained.

The sense-data generating unit 21 in the previous embodiments converts the engine operating parameters into the stimuli which simulate the actual stimuli (such as the visual image, the acceleration, the vibration and the sounds) perceived by the driver during the actual driving of the vehicle. However, since a complicated system is required to simulate the actual stimuli, the cost for manufacturing the sense-data generating unit 21 may increase accordingly. Further, even though the stimuli generated by the sense-data generating unit 21 does not precisely simulate the actual stimuli, the driveability can be directly perceived by the inspector to some extent if the stimuli generated by the sense-data generating unit 21 changes in accordance with the changes in the engine operating data. Therefore, the sense-data generating unit 21 in the embodiments explained below generates stimuli based on the engine operating data in a simple manner to facilitate the evaluation of the driveability.

First, an embodiment of simplified sense-data generating unit 21 which uses a sound generator similar to the sound generator 21c in FIG. 5 will be explained. In this embodiment, the configuration of the sense-data generating unit 21 is substantially the same as the embodiment in FIG. 5. However, the sound generator 21c in this embodiment generates the sound in accordance with only the engine speed and the engine output torque. More specifically, the sound generator 21c generates the sound from the loudspeaker 43 in such a manner that the loudness of the sound becomes larger as the engine output torque increases and the frequency of the sound becomes higher as the engine speed becomes higher. In this case, the inspector directly perceives the engine output torque and the engine speed from the loudness and the pitch of the sound from the loudspeaker 43. Therefore, the inspector can perceive the factors affecting the driveability such as acceleration and the surge from the changes in the loudness and the pitch of the sound.

Although the simplified sense-data generating unit in this embodiment uses audible stimuli, other stimuli which can be generated in a simple manner may be used in order to facilitate the inspector's comprehension of the driveability of the vehicle. For example, a simplified sense-data generating unit may generate vibrations in accordance with the engine speed (or the running speed of the vehicle). In this case, the simplified sense-data generating unit is provided with a vibrating plate which generates the vibration by, for example, a piezoelectric element and changes the frequency of the vibration in accordance with the engine speed (or the running speed of the vehicle). The inspector can directly perceive the speed and the acceleration of the vehicle from the change in the frequency of the vibration by simply touching the vibration plate.

The simplified sense-data generating unit may use other kinds of stimuli. For example, by wrapping the inspector's hand with an inflatable band and by changing the air pressure supplied to the band in accordance with the engine speed or the vehicle running speed, the inspector can directly perceive the speed and the acceleration of the vehicle from the air pressure exerted on the hand. Further, by blowing air on the inspector's body and by changing the strength of the air flow, the inspector can also perceive the speed and the acceleration of the vehicle directly from the change in the strength of the air flow. In these cases, though the stimuli generated by the simplified sense-data generating unit are not exactly the same as the stimuli on which the driver assess the driveability in the actual operation of the vehicle, the inspector can perceive the driveability far more directly compared to the case where the driveability data are indicated only by numerical values.

In the embodiment in FIG. 1, the control unit 17 stores the engine control data (such as the fuel injection amount and the ignition timing of the engine) and the driveability data (the running speed and the acceleration of the vehicle, the vibration of the vehicle body, noise etc.) during the test. Therefore, if the engine is once tested, the driveability data during the test can be reproduced repeatedly without actually operating the engine. Therefore, the driveability data can be evaluated by different inspectors to facilitate an objective evaluation of the driveability. Further, since the engine control data are stored in the control unit 17 in conjunction with the driveability data, the engine control parameters can be correlated with the driveability in this embodiment and can be used for improving the driveability of the vehicle by optimizing the engine control.

As explained in FIGS. 2 through 5, the vehicle operation data such as operations of the accelerator, the steering wheel, and the brake pedal and the clutch pedal by the inspector are converted into electric signals and are supplied to the control unit 17. The control unit 17 controls the engine 10 and the dynamic dynamometer 15 so that the engine 10 operates in accordance with the running condition of the vehicle caused by the inspector's operation of the dummy operating devices. Therefore, the driveability under the special running conditions such as during a sudden acceleration or deceleration or passing another vehicle can be evaluated easily. Further, since the engine operating parameters and the driveability data in these special running condition are also stored in the control unit 17, the driveability under the special running conditions can be precisely reproduced without actually performing the test. Therefore, the driveability under the special conditions can be precisely evaluated according to these embodiments.

We claim:

1. A system for evaluating an engine to determine the driveability of a vehicle incorporating the engine without mounting the engine in the vehicle, the system comprising:

running condition simulating means for generating a load of the engine corresponding to running conditions of the vehicle and for imposing the load on the engine while the engine is operated on a test bed;

operating parameter detecting means for detecting engine operating parameters including a speed and an output torque of the engine when the load is imposed on the engine by the running condition simulating means;

driveability data generating means for generating, based on the detected operating parameters, driveability data corresponding to at least one driveability condition of the vehicle, wherein the at least one driveability condition would be directly perceived by at least one human sense of a vehicle operator in operating a vehicle with the engine mounted therein; and sense-data generating means for converting the driveability data into stimuli which can be directly perceived by the at least one human sense in a manner corresponding to the direct perception of the driveability condition by the at least one human sense during operation of a vehicle equipped with the engine.

2. A vehicle driveability evaluation system as set forth in claim 1, wherein the sense-data generating means converts the driveability data into a stimulus on which a driver of the vehicle assesses a driveability during an actual vehicle operation based on a characteristic of the vehicle.

3. A vehicle driveability evaluation system as set forth in claim 1, further comprising storage means for storing the engine operating parameters and the driveability data in conjunction with control data used for controlling the operation of the engine.

4. A vehicle driveability evaluation system as set forth in claim 1, further comprising vehicle operation data generating means for generating vehicle operation data representing driving operations of the vehicle by a driver and control means for controlling the engine and the running condition simulating means based on said vehicle operation data.

* * * * *